United States Patent [19]

Haynes et al.

[11] Patent Number: 4,844,812
[45] Date of Patent: Jul. 4, 1989

[54] PUMPED HYDROCYCLONE BACKPRESSURE CONTROL

[75] Inventors: Michael D. Haynes, Hawkhurst; Robert A. Stuck, Richmond, both of England; Robert H. Wilson, Spring, Tex.

[73] Assignee: Amoco Corporation, Chicago, Ill.

[21] Appl. No.: 209,762

[22] Filed: Jun. 22, 1988

[51] Int. Cl.$^4$ .......................................... B01D 17/038
[52] U.S. Cl. ...................... 210/741; 210/744; 210/787; 210/104; 210/112; 210/134; 210/137; 210/512.1
[58] Field of Search ............... 210/741, 744, 787, 788, 210/805, 104, 112, 115, 134, 137, 512.1, 512.2, 512.3

[56] References Cited

U.S. PATENT DOCUMENTS

| | | | |
|---|---|---|---|
| 2,864,499 | 12/1958 | Teuteberg | 210/512.1 |
| 3,129,173 | 4/1964 | Schulze | 210/512.1 |
| 3,791,575 | 2/1974 | Kartinen et al. | 210/115 |
| 3,929,639 | 12/1975 | Turner et al. | 210/512.2 |
| 3,957,637 | 5/1976 | Morey | 210/137 |

OTHER PUBLICATIONS

Perry, "Chemical Engineer's Handbook", pp. 6-13, 4th ed., 1963.
Tiederman et al, "Experimental Design of Hydrocyclones for the Clarification of Waste Water", from Flow Studies in Air and Water Pollution Conference, 1973, pp. 39-48.

*Primary Examiner*—Peter Hruskoci
*Assistant Examiner*—Christopher Upton
*Attorney, Agent, or Firm*—Scott H. Brown; Fred E. Hook

[57] ABSTRACT

A method and related system are disclosed for controlling the operation of a fixed rate pumped hydrocyclone liquid separation unit to maintain a desired back-pressure therein. A pressure control valve and a liquid level control valve are connected to a separated liquid discharge conduit extending from at least one hydrocyclone. The pressure control valve operates in response to the pressure of the liquid introduced into the hydrocyclone and the liquid level control valve operates in response to the liquid level within a liquid holding vessel that supplies the liquid through a fixed rate pump to the hydrocyclone.

6 Claims, 2 Drawing Sheets

PUMPED HYDROCYCLONE BACKPRESSURE CONTROL

BACKGROUND OF THE INVENTION

1. Field of the Invention

The present invention relates to a system for controlling the efficient operation of a pumped hydrocyclone liquid separating unit and, more particularly, to such a control system which maintains a desired backpressure within the hydrocyclones.

2. Setting of the Invention

Liquid separators, and especially hydrocyclones, are well-known for use in separating different density fractions of liquids, such as oil and water. Hydrocyclones have been utilized extensively within oil production facilities where environmental considerations require that only a minute amount of oil be discharged with separated produced water.

On offshore oil production facilities, there is a need for minimizing the weight and size of onboard equipment. To meet this need, various configurations of hydrocyclone systems have been developed. One configuration that has been found to be desirous is a pumped hydrocyclone liquid separating unit, and generally includes one or more hydrocyclones arranged in parallel flow with the liquid mixture introduced into the hydrocyclones under pressure.

One problem common to utilizing hydrocyclones in any configuration of liquid separating units is that separation efficiency of the hydrocyclones is extremely sensitive to the liquid introduction pressure and rate and the backpressure of the separated liquids exiting the hydrocyclones. Various control devices and piping arrangements have been used to control the flow of liquid through the banks of hydrocyclones and have included the use of preprocessing units to provide a more constant flow of liquid to the pump and liquid level control valves thereon to maintain the desired backpressure. One major problem encountered with this configuration has been that the surges of liquid from the wells entering preprocessing units have caused the backpressure control system to over-compensate resulting in a drastic reduction in backpressure. Thus, the hydrocyclones pass unacceptable quantities of oil to be discharged with the separated water and cause unacceptable vibration.

There is a need for a pumped hydrocyclone backpressure control system which maintains the desired backpressure within the liquid separation unit so that the banks of hydrocyclones are operated within the most efficient volume flow and backpressure parameters.

SUMMARY OF THE INVENTION

The present invention is designed to overcome the foregoing deficiencies and meet the above-described needs. The present invention provides a method and related system for controlling the operation of a pumped hydrocyclone liquid separating unit to maintain a desired back pressure within the unit. Within the method, the quantity of liquid exiting a dense liquid fraction outlet of a hydrocyclone is adjusted in response to variations in the pressure of liquid measured between a liquid inlet of a hydrocyclone and a fixed rate pump that provides the liquid to the hydrocyclone.

A portion of the liquid exiting the dense liquid fraction outlet of the hydrocyclone is returned through a return conduit to a liquid holding vessel which supplies the liquid to the fixed rate pump. The volume of liquid so returned is controlled by adjusting the quantity of liquid exiting the dense liquid fraction of the hydrocyclone to be passed from the system downstream of the liquid return conduit in response to variations in the liquid level within the liquid holding vessel.

By using the present invention, control actions in response to changes in liquid level and backpressure parameters for the liquid separating unit are coordinated, as will be described in more detail below.

DETAILED DESCRIPTION OF THE PREFERRED EMBODIMENT

Figure 1:
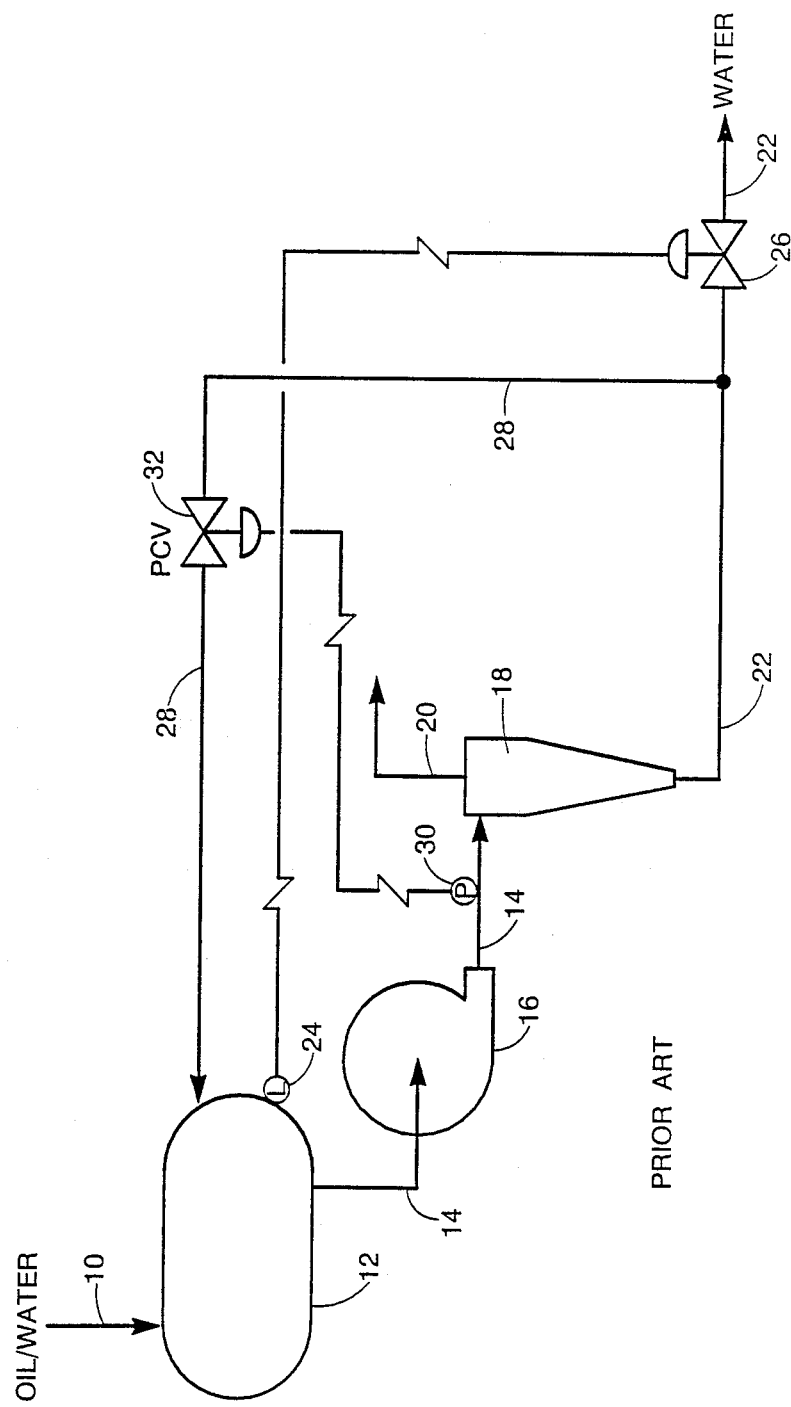
FIG. 1 is a schematic diagram showing a pumped hydrocyclone liquid separating unit of the prior art.

A method is described herein for controlling the operation of a pumped hydrocyclone liquid separating unit to maintain a desired backpressure within the liquid separating unit. For a better understanding of the present invention, the Prior Art System of FIG. 1 will be described below. As shown in FIG. 1, liquid mixture, such as oil and water, is introduced through a conduit 10 into any suitable preprocessing vessel 12. The liquid passes from the vessel 12 through an outlet conduit 14 to a pump 16, which provides the liquid at a desired constant flow rate and constant pressure to one or more hydrocyclones 18. Separated oil exits the hydrocyclone 18 through a lower central opening through a discharge conduit 20 and the oil flows to other applications, as is well-known in the art. Water exits the hydrocyclones 18 through a lower central opening through a discharge conduit 22 whereafter the separated water is disposed of as desired.

A liquid level sensor 24 is located within the interior of the liquid holding vessel 12, and sends a control signal to a liquid control valve 26 on the discharge conduit 22. A return conduit 28 is provided between the water discharge conduit 22 upstream of the level control valve 26 and the liquid holding vessel 12. The quantity of the water returned is controlled directly by the operation of the liquid level control valve 26 and is supplemented by a pressure control system. The pressure control system includes a pressure sensor 30 which is operatively connected to the conduit 14 downstream of the pump 16 and upstream of the hydrocyclone 18 to provide a signal to a pressure control valve 32 on the return conduit 28.

In the operation of the system shown in FIG. 1, if the liquid level within the liquid holding vessel 12 suddenly rises because of a large influx of liquid through the conduit 10, the liquid level sensor 24 senses this rise and automatically causes the liquid level control valve 26 to open. Once this valve 26 opens, the backpressure within the hydrocyclone system drops quickly and usually to a pressure where the internal vortex formation within the hydrocyclone 18 collapses, thus, no oil-water separation occurs. Oil and water are then pumped directly out of the hydrocyclones 18 and out the discharge conduit 22.

Since the backpressure has dropped, the pressure sensor 30 causes the pressure control valve 32 to close. When the liquid level within the vessel 12 falls to within an acceptable level, the liquid level sensor 24 causes the liquid control valve 26 to decrease the quantity of water being discharged out the conduit 22. Usually, the valve 26 will close fully. This closure of the valve 26 does not cause a sufficiently rapid increase in backpressure measured by the sensor 30, so the pressure control valve 32 remains closed, thus the pump 16 continues to pump liquid against a closed looped, i.e., both valves 26 and 32 are closed, resulting in pressure release valves (not shown) opening and also causing damage to the pump.

Figure 2:
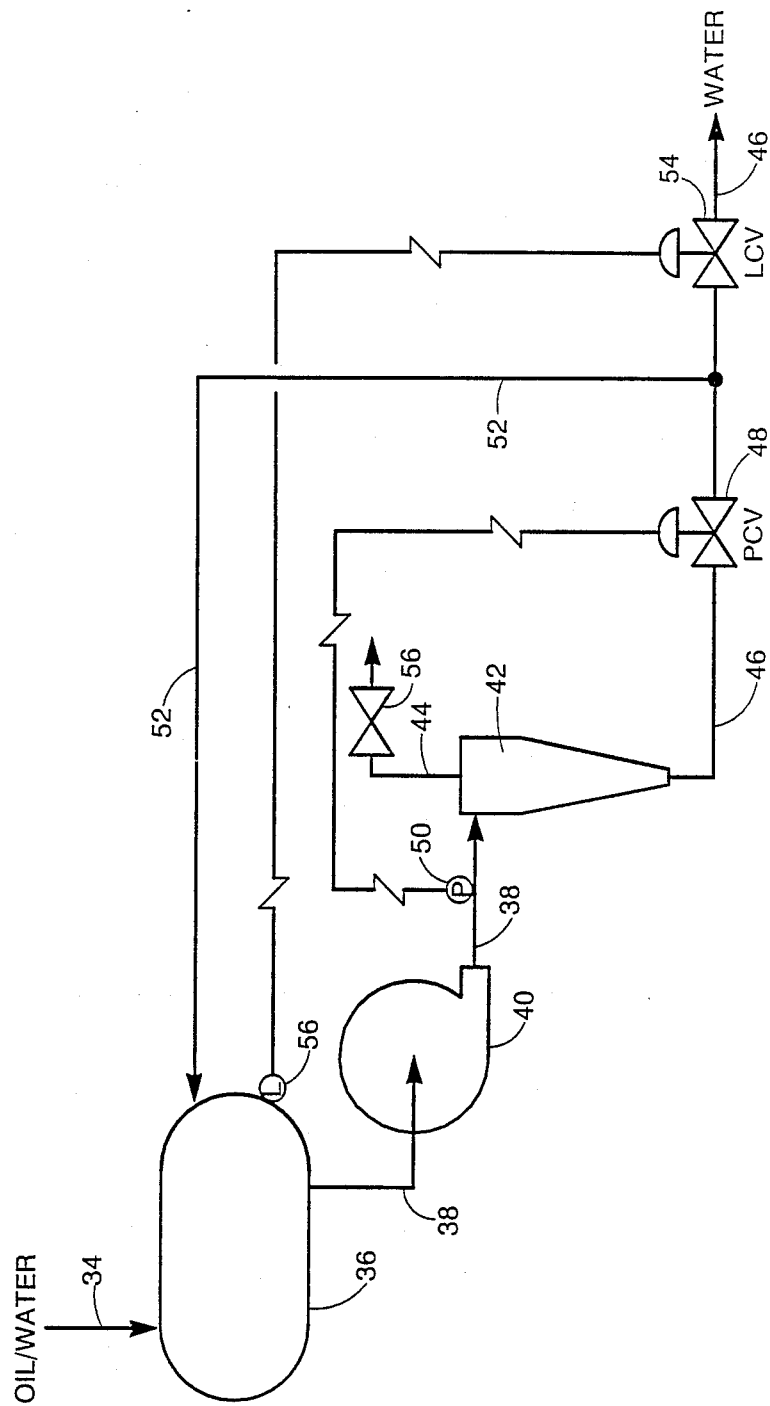
FIG. 2 is a schematic diagram showing a pumped hydrocyclone liquid separating unit embodying the present invention.

To provide a better backpressure control system which eliminates the problems described above, the present invention has been developed. As shown in FIG. 2, a pumped hydrocyclone system of one embodiment of the present invention includes a conduit 34 to introduce a liquid mixture, such as oil and gas, directly from one or more wellbores or from preprocessing units (not shown) as is desired into a liquid holding vessel 36. The liquid holding vessel 36 provides a buffer against the surging of the produced liquid, as is well-known to those skilled in the art. The liquid holding vessel 36 can be one or more water knockouts, degassing units, settling tanks, or combinations of these as is desired.

The liquid exits the liquid holding vessel 36 via a conduit 38 where it enters a pump 40 before proceeding into a liquid inlet of one or more hydrocyclones 42. The pump 40 can be of any desired configuration; however, a progressive cavity pump is desired to prevent further shearing of the partially separated oil particles, and a vertical or horizontal progressive cavity mono pump is most preferred. Further, it has been found that pumps of a fixed rate or fixed speed are preferable to provide the necessary constant backpressure and flow rates as needed for the hydrocyclones to operate efficiently. Variable rate pumps can be utilized, however, it has been found that the pump speed control systems needed to vary the pumped liquid pressure are not sensitive enough to control the backpressure on the hydrocyclones. Further, one or more pumps 40 can be utilized with the number of pumps depending on the quantity of produced liquid entering through the conduit 38 and the quantity and size of the hydrocyclones 42.

The hydrocyclone 42 can be a single hydrocyclone or, preferably, one or more banks of a plurality of hydrocyclones connected in parallel so that the flow of liquid passing through the conduit 38 passes into the banks of hydrocyclones and then passes out through common manifolds (not shown) for the separated oil and separated water. The separated oil passes through an oil discharge conduit 44 to further processing or storage, as is desired. The separated water passes through a water discharge conduit 46 wherein the water is either further processed or in most offshore environments is discharged overboard into the sea.

The novel pressure control system of the present invention utilizes a pressure control valve 48 located on the water discharge conduit 46 downstream of the hydrocyclone 42 and receives its operative control signals from a pressure sensor 50 operatively connected to the conduit 38 downstream of the pump 40 and upstream of the hydrocyclone 42. Because the system operates with a fixed rate pump 40 to maintain the desired constant liquid flow rate and pressure, a portion of the liquid that has passed through the hydrocyclone 42 is recycled through a conduit 52 that extends from the outlet conduit 46 downstream of the valve 48 to the interior of the liquid holding vessel 36. The quantity of the liquid being recycled or returned to the liquid holding vessel 36 through the conduit 52 is determined by the quantity of liquid entering the vessel 36 and is controlled by a level control valve 54 located on the conduit 46 downstream of the conduit 52. The level control valve 54 receives operative signals from a liquid level sensor 56 operatively connected to the interior of the liquid holding vessel 36. Optionally, an automatically controlled or manually adjusted valve 56 can be provided on the oil discharge line 44 to assist in maintaining a desired backpressure on the hydrocyclone system 42.

Within the operation of the present invention, the liquid mixture of oil and water passes through the conduit 34 into the vessel 36 and then is passed via conduit 38 through the pump 40 and into the hydrocyclone 42. In the event that a surge of liquid enters the liquid holding vessel 36 so that the liquid level within the vessel 36 rises above a preset limit, the valve 54 is opened thereby permitting a quantity of water to be discharged decreasing the quantity of water being returned through the conduit 52. In this event, the liquid backpressure decreases within the conduit 46 and within the hydrocyclone 42. The pressure sensor 50 monitors this and then causes the position of the pressure control valve 48 to adjust accordingly.

In the event of a large and sudden surge of liquid into the vessel 36 and the liquid control valve 54 opens to its maximum open position and the pressure drops to an unacceptable level, then the pressure control valve 48 will rapidly close and maintain the adequate pressure in combination with the valve 56, if utilized, which will prevent the pump 40 from acting against a closed looped system.

In one example of the present invention, a single fixed rate horizontal progressive cavity mono pump is operated at a fixed speed of 885 rpm to deliver liquid to two banks of 20 8" OD hydrocyclones 42 at a rate of 25,000 bbls/day within a constant backpressure of 11 bars. In this example, if the liquid control valve 54 is closed due to insufficient liquid level within the liquid holding vessel 36, the pump 40 will still operate thereby recycling liquid at the fixed rate of 25,000 bbls/day through the conduit 38, the hydrocyclone 42, the conduit 46 and the return conduit 52 back to the liquid holding vessel 36. If, for example, 15,000 bbls of liquid enters the liquid holding vessel 36, and 10 bbls of oil is separated and discharged through the conduit 44, then 14,990 bbls of water will be discharged through the conduit 46 and 10,000 bbls of liquid will be returned through the conduit 52.

Wherein the present invention has been described in particular relation to the drawings attached hereto, it should be understood that other and further modifications, apart from those shown or suggested herein, may be made within the scope and spirit of the present invention.

We claim:

1. A method of controlling the operation of a pumped hydrocyclone liquid separation unit for separation of liquids of different densities to maintain a desired backpressure therein, comprising:

maintaining a desired flow rate and pressure of liquid exiting a dense liquid fraction outlet of a hydrocylone utilizing a pressure control valve downstream of the dense liquid fraction outlet of the hydrocyclone and being operative in response to the pressure of a liquid mixture measured between a liquid mixture inlet of the hydrocyclone and a fixed rate pump providing the liquid mixture to the liquid mixture inlet of the hydrocyclone; and returning through a liquid return conduit downstream of said pressure control valve a portion of the liquid exiting the dense fraction outlet of the hydrocyclone to a vessel supplying the liquid mixture to the fixed rate pump, the quantity of the dense liquid fraction returning to the vessel being controlled by adjusting the quantity of the dense liquid fraction to be passed downstream of the liquid return conduit in response to the liquid level within the vessel.

2. A system to maintain a desired backpressure within a pumped hydrocyclone liquid separation unit, the unit including a liquid holding vessel supplying liquid to a pump that supplies liquid through an inlet conduit under pressure to at least one hydrocyclone, each hydrocyclone having first and second separated liquid discharge conduits, the system comprising:

a pressure control valve connected to the first separated liquid discharge conduit and operative in response to control signals from a pressure sensor connected to the inlet conduit between the pump and at least one hydrocyclone;

a liquid return conduit extending from the first separated liquid discharge conduit downstream of the pressure control valve to the liquid holding vessel; and a liquid level control valve connected to the first separated liquid discharge conduit downstream of the liquid return conduit and operative in response to control signals from a liquid level sensor operatively connected to the liquid holding vessel 3. A system of claim 2 wherein the pumped hydrocyclone liquid separation unit includes a plurality of hydrocyclones connected in parallel flow.

4. A system of claim 2 wherein the pump comprises a fixed rate pump.

5. A system of claim 4 wherein the fixed rate pump comprises a horizontal progressive cavity mono pump.

6. A system of claim 2 and including a flow control valve on the second separated liquid discharge conduit.

* * * * *